United States Patent
Yang (10) Patent No.: US 7,504,085 B2
(45) Date of Patent: Mar. 17, 2009

(54) ALUMINA-BASED PEROVSKITE CATALYSTS AND CATALYST SUPPORTS

(75) Inventor: Xiaolin David Yang, Edison, NJ (US)

(73) Assignee: BASF Catalysts LLC, Florham Park, NJ (US)

( * ) Notice: Subject to any disclaimer, the term of this patent is extended or adjusted under 35 U.S.C. 154(b) by 662 days.

(21) Appl. No.: 11/127,615

(22) Filed: May 12, 2005

(65) Prior Publication Data

US 2006/0257305 A1    Nov. 16, 2006

(51) Int. Cl.
| | |
|---|---|
| B01J 21/04 | (2006.01) |
| B01J 23/10 | (2006.01) |
| B01J 23/42 | (2006.01) |
| B01J 23/44 | (2006.01) |
| B01J 23/46 | (2006.01) |
| B01J 23/56 | (2006.01) |
| B01J 23/63 | (2006.01) |
| B01J 37/04 | (2006.01) |
| B01J 37/08 | (2006.01) |
| C01B 13/18 | (2006.01) |
| C01F 1/00 | (2006.01) |
| C01F 7/00 | (2006.01) |
| C01F 7/02 | (2006.01) |
| C01F 17/00 | (2006.01) |
| C01G 55/00 | (2006.01) |

(52) U.S. Cl. .............. 423/600; 423/21.1; 423/593.1; 423/625; 423/628; 502/302; 502/303; 502/325; 502/332; 502/333; 502/334; 502/339; 502/355; 502/525

(58) Field of Classification Search .......... 502/302, 502/303, 325, 332, 333, 334, 339, 355, 525; 423/21.1, 26, 266, 592.1, 593.1, 600, 625, 423/628

See application file for complete search history.

(56) References Cited

U.S. PATENT DOCUMENTS

| | | | |
|---|---|---|---|
| 3,865,752 A | 2/1975 | Remeika et al. ............ | 252/462 |
| 3,865,923 A | 2/1975 | Stephens ................. | 423/213.2 |
| 3,884,837 A | 5/1975 | Remeika et al. ............ | 252/462 |
| 3,897,367 A | 7/1975 | Lauder ..................... | 252/462 |
| 3,929,670 A | 12/1975 | Kudo et al. ............. | 252/455 R |

(Continued)

FOREIGN PATENT DOCUMENTS

GB    1 563 647    3/1980

OTHER PUBLICATIONS

Catalytic oxidation over lanthanum-transition metal perovskite materials—(M. O'Connell, A.K. Norman, C.F. Hüttermann, M.A. Morris)—Department of Chemistry, Materials Chemistry, University College Cork, Cork, Ireland Catalysis Today 47 (1999) 123-132.

(Continued)

*Primary Examiner*—Timothy C Vanoy
*Assistant Examiner*—Serena L Hanor
(74) *Attorney, Agent, or Firm*—Raymond F. Keller (57) ABSTRACT

An alumina-based perovskite is formed by mixing a lanthanide source with a transitional alumina to form a dual-phase composition comprising in-situ formed $LnAlO_3$ dispersed in alumina. The lanthanide content of the composition ranges from 6-35 wt. % to yield a high surface area composition which is useful as a catalyst or catalyst support such as for precious metals.

20 Claims, 2 Drawing Sheets

U.S. PATENT DOCUMENTS

| | | | | |
|---|---|---|---|---|
| 4,001,371 | A | 1/1977 | Remeika et al. | 423/213.2 |
| 4,049,583 | A | 9/1977 | Lauder | 252/466 PT |
| 4,107,163 | A | 8/1978 | Donohue | 423/263 |
| 4,126,580 | A | 11/1978 | Lauder | 252/462 |
| 4,151,123 | A | 4/1979 | McCann, III | 252/462 |
| 4,511,673 | A * | 4/1985 | Eto | 502/302 |
| 4,748,143 | A | 5/1988 | Tabata et al. | 502/304 |
| 5,185,311 | A | 2/1993 | Tabata et al. | 502/304 |
| 5,318,937 | A | 6/1994 | Jovanovic et al. | 502/303 |
| 5,736,482 | A | 4/1998 | Durand et al. | 502/303 |
| 5,837,634 | A | 11/1998 | McLaughlin et al. | 501/127 |
| 5,882,616 | A | 3/1999 | Ziebarth et al. | 423/245.3 |
| 6,060,420 | A * | 5/2000 | Munakata et al. | 502/302 |
| 6,255,358 | B1 | 7/2001 | Singleton et al. | 518/715 |
| 6,531,425 | B2 | 3/2003 | Golden | 502/302 |
| 2004/0138060 | A1 | 7/2004 | Rapier et al. | 502/302 |
| 2004/0221508 | A1 | 11/2004 | Jin et al. | 48/198.7 |
| 2005/0255993 | A1 * | 11/2005 | Tanaka et al. | 502/302 |

OTHER PUBLICATIONS

Characterization of lanthana/alumina composite oxides—(S. Subramanian, M.S. Chattha and C.R. Peters) Research Staff, Ford Motor Company—Journal of Molecular Catalysis, 69 (1991) 235-245.

Dispersion studies on the system $La_2O_3/\gamma$-$Al_2O_3$—(M. Bettman, R.E. Chase, K. Otto, and W.H. Weber) Research Staff, Ford Motor Company—Journal of Catalysis 117, 447-454 (1989).

Hexane total oxidation on $LaMO_3$ (M=Mn, Co, Fe) perovskite-type oxides (R. Spinicci, A. Tofanari, M. Faticanti, I. Petti, P. Porta)—Journal of Molecular Catalysis A: Chemical 176 (2001) 247-252.

Oxidative coupling of methane on $LaAlO_3$ perovskites partially substituted with alkali or alkali-earth ions—(R. Spinicci, P. Marini, S. De Rossi, M. Faticanti, P. Porta)—Journal of Molecular Catalysis A: Chemical 176 (2001) 253-265.

The influence of high partial steam pressures on the sintering of lanthanum oxide doped gamma alumina—(H. Schaper, D.J. Amesz, E.B.M. Doesburg and L.L. Van Reijen)—Laboratory of Inorganic and Physical Chemistry—Applied Catalysis, 9 (1984) 129-132.

Thermal Stabilization of Transition Alumina by Structural Coherence with $LnAlO_3$ (Ln=La, Pr, Nd)—(François Qudet, Pierre Courtine, and Alain Vejux)—Journal of Catalysis 114, 112-120 (1988).

"Atomic Scale Mechanism of the Transformation of $\gamma$-Alumina to $\theta$-Alumina", Cai et al., The American Physical Society, vol. 89, No. 23—(2002) pp. 235501-1-235501-4.

"Catalytic Properties of $BaMAl_{11}O_{19-\alpha}$(M=Cr, Mn, Fe, Co, and Ni) for High-Temperature Catalytic Combustion", Machida et al., Journal of Catalysis, vol. 120, (1989) pp. 377-386.

"Deactivation of High Temperature Combustion Catalysts", Thevenin, et al., Applied Catalysis A: General, vol. 212 (2001), pp. 189-197.

"Effect of Structural Modification on the Catalytic Property of Mn-Substituted Hexaaluminates", Machida, et al., Journal of Catalysis, vol. 123, (1990) pp. 477-485.

"Electrocatalytic Activity and Oxygen Adsorption Property of Perovskite-Type Oxides, $LnMnO_3$ (Ln: Rare Earth)"; Sakaguchi, et al., Electrochimica Acta, vol. 35, No. 1. (1990) pp. 65-67.

"Low-cost Oxygen Electrode Material", Meadowcroft, in Nature, vol. 226, (1970) pp. 847-848.

"Exploration of Perovskite-Like Catalysts", Voorhoeve et al., Mat. Res. Bulletin, vol. 9, (1974) pp. 655-666.

"High Temperature Thermal Stabilization of Alumina Modified by Lanthanum Species", Applied Catalysis A: General, vol. 205 (2001) pp. 159-172.

"Low-Temperature Synthesis of Ultrafine $La_{0.84}Sr_{0.16}MnO_3$ Powder by an Autoignition Process", Chakraborty et al., Journal Materials Research., vol. 9, No. 4, (1994) pp. 986-991.

"Perovskite Oxides: Materials Science in Catalysis", Voorhoeve et al., Science, vol. 195, No. 4281, (1977) pp. 827-833.

"Preparation and Characterisation of High Surface Area Semiconducting Oxides", Tseung et al., Journal of Materials Sciences, (1970) pp. 604-610.

"Preparation of High Surface Area Substituted $LaMnO_3$ Catalysts", Johnson, Jr., et al., Ceramic Bulletin, vol. 55, (1976) pp. 520-523.

"Preparation of Highly Dispersed Mixed Oxides and Oxide Solid Solutions by Pyrolysis of Amorphous Organic Precursors", Marcilly et al., Journal of The American Ceramic Society, vol. 53, No. 1, (1970) pp. 56-57.

"Production of Strontium-Substituted Lanthanum Manganite Perovskite Powder by the Amorphous Citrate Process", Baythoun et al., Journal of Materials Science, vol. 17 (1982) pp. 2757-2769.

"Promising Catalyst for Auto Exhaust", Libby, Science, vol. 171 (1971) pp. 499-500.

"Rare-Earth Manganites: Catalysts with Low Ammonia Yield in the Reduction of Nitrogen Oxides", Voorhoeve et al., Science, vol. 180 (1973) pp. 62-64.

"Rare-Earth Oxides of Manganese and Cobalt Rival Platinum for the Treatment of Carbon Monoxide in Auto Exhaust", Voorhoeve et al., Science, vol. 177 (1972) pp. 353-354.

"Stabilization of Alumina toward Thermal Sintering by Silicon Addition", Beguin et al., Journal of Catalysis, vol. 127, (1991) pp. 595-604.

"Standard Transition Aluminas. Electron Microscopy Studies", Santos, et al., Materials Research, vol. 3, No. 4 (2000) pp. 104-114.

"Structures and Transformation Mechanisms of the $\eta$, $\gamma$ and $\theta$ Transition Aluminas", Zhou et al., Acta Cryst., vol. B47, (1991), pp. 617-630.

"Studies of Some Perovskite Oxidation Catalysts Using DTA Techniques", Johnson Jr., et al., Thermochimica Acta, vol. 7 (1973), pp. 303-309.

* cited by examiner

Fig. 2

ALUMINA-BASED PEROVSKITE CATALYSTS AND CATALYST SUPPORTS

The present invention relates generally to novel perovskite-type supports and catalysts.

BACKGROUND OF THE INVENTION

It is well known that the efficiency of supported catalyst systems is often related to the surface area on the support. This is especially true for systems using precious metal catalysts or other expensive catalysts. The greater the surface area, the more catalytic material is exposed to the reactants and the less time and catalytic material is needed to maintain a high rate of productivity.

Alumina ($Al_2O_3$) is a well-known support for many catalyst systems. It is also well known that alumina has a number of crystalline phases such as alpha-alumina (often noted as α-alumina or α-$Al_2O_3$), gamma-alumina (often noted as γ-alumina or γ-$Al_2O_3$) as well as a myriad of alumina polymorphs. Gamma-$Al_2O_3$ is a particularly important inorganic oxide refractory of widespread technological importance in the field of catalysis, often serving as a catalyst support. Gamma-$Al_2O_3$ is an exceptionally good choice for catalytic applications because of a defect spinel crystal lattice that imparts to it a structure that is both open and capable of high surface area. Moreover, the defect spinel structure has vacant cation sites giving the gamma-alumina some unique properties. Gamma-alumina constitutes a part of the series known as the activated, transition aluminas, so-called because it is one of a series of aluminas that can undergo transition to different polymorphs. Santos et al. (Materials Research, 2000; vol. 3 (4), pp. 104-114) disclosed the different standard transition aluminas using Electron Microscopy studies, whereas Zhou et al. (Acta Cryst., 1991, vol. B47, pp. 617-630) and Cai et al. (Phys. Rev. Lett., 2002, vol. 89, pp. 235501) described the mechanism of the transformation of gamma-alumina to theta-alumina.

The oxides of aluminum and the corresponding hydrates, can be classified according to the arrangement of the crystal lattice. Some transitions within a series are known; for example, low-temperature dehydration of an alumina trihydrate (gibbsite, $Al(OH)_3$) above 100° C. with the presence of steam provides an alumina monohydrate (boehmite, AlO(OH)). Continued dehydration at temperatures above 450° C. leads to the transformation from boehmite to γ-$Al_2O_3$. Further heating may result in a slow and continuous loss of surface area and a slow conversion to other polymorphs of alumina having much lower surface areas. Thus, when gamma-alumina is heated to high temperatures, the structure of the atoms collapses such that the surface area decreases substantially. Higher temperature treatment above 1100° C. ultimately provides α-$Al_2O_3$, a denser, harder oxide of aluminum often used in abrasives and refractories. While alpha-alumina has the lowest surface area, it is the most stable of the aluminas at high temperatures. Unfortunately, the structure of alpha-alumina is less well suited to certain catalytic applications because of a closed crystal lattice, which imparts a relatively low surface area to the alpha-alumina particles.

Alumina is ubiquitous as supports and/or catalysts for many heterogeneous catalytic processes. Some of these catalytic processes occur under conditions of high temperature, high pressure and/or high water vapor pressure. The prolonged exposure to high temperature typically up to 1,000° C., combined with a significant amount of oxygen and sometimes steam can result in catalyst deactivation by support sintering. The sintering of alumina has been widely reported in the literature (see for example Thevenin et al, Applied Catalysis A: General, 2001, vol. 212, pp. 189-197) and the phase transformation of alumina due to an increase in operating temperature is usually accompanied by a sharp decrease in surface area. In order to prevent this deactivation phenomenon, various attempts have been made to stabilize the alumina support against thermal deactivation (see Beguin et al., Journal of Catalysis, 1991, vol. 127, pp. 595-604; Chen et al., Applied Catalysis A: General, 2001, vol. 205, pp. 159-172).

For example, it is well known that adding lanthanum to alumina, a process also known as La-doping, can stabilize the alumina structure. Specifically, U.S. Pat. No. 6,255,358 discloses a catalyst comprising a gamma-alumina support doped with an amount of lanthanum oxide, barium oxide, or a combination thereof effective for increasing the thermal stability of the catalyst. The patent discloses a catalyst comprising per 100 parts by weight of the support from about 10-70 parts by weight cobalt and optional components, including from about 0.5 to 8 parts by weight lanthana. Similarly, U.S. Pat. No. 5,837,634 discloses a process for preparing a stabilized alumina, e.g., gamma alumina, of enhanced resistance to high temperature surface area loss such as by the addition of lanthana to a precursor boehmite alumina. In an example, a mixture of boehmite alumina, nitric acid, and stabilizers such as lanthanum nitrate was dispersed and the mixture aged for 4 hours at 350° F. Subsequently, the formed powder was calcined for 3 hours at 1200° C.

In general, the prior art has focused on the stabilization of alumina by using a small amount of lanthana, typically below 10%, and in most practices between 1-6 wt. %. In "Characterization of lanthana/alumina composite oxides," S. Subramanian et al., Journal of Molecular Catalysis, Volume 69, 1991, pages 235-245, lanthana/alumina composite oxides were formed. It was found that as the lanthana weight loading increased, the surface area of the lanthana dispersed in the composite oxide also increased and reached a plateau at 8% $La_2O_3$ loading. It was also found that the total BET surface area of the composite oxide decreased sharply as the lanthana loading increased above 8%. The composite oxides were prepared by the incipient wetness procedure in which the alumina was impregnated with lanthanum nitrate hexahydrate and the precursors dried and then calcined at 600° C. for 16 hours.

It has also been reported that surface perovskite-species on alumina can be formed by doping the alumina with small amounts of lanthanum. Thus, in "The Influence of High Partial Steam Pressures on the Sintering of Lanthanum Oxide-Doped Gamma Alumina," H. Schaper et al., Applied Catalysis, 1984, Volume 9, pages 129-132, experiments were conducted by doping gamma alumina with 0-5 mol % lanthanum oxide. In all the lanthanum oxide-promoted samples, lanthanum aluminate ($LaAlO_3$) lines were observed. The addition of 4-5 mol % of lanthanum oxide drastically decreased the surface area loss of gamma alumina at the high partial steam pressures.

For most of the lanthana-doped alumina compositions, the lanthanum is in the form of lanthanum oxide. In "Dispersion Studies on the System $La_2O_3$Y-$Al_2O_3$," M. Bettman et al., Journal of Catalysis, Volume 117, 1989, pages 447-454, alumina samples with different lanthanum concentrations were produced by impregnation with aqueous lanthanum nitrate, followed by calcination at various temperatures. It was found that up to a concentration of 8.5 µmol La/$m^2$, the lanthana was in the form of a 2-dimensional overlayer, invisible by XRD. For greater lanthana concentrations, the excess lanthana formed crystalline oxides detectable by XRD. In samples calcined to 650° C., the crystalline phase was cubic lanthanum oxide. After calcination at 800° C., the lanthana reacted to form the lanthanum aluminate, $LaAlO_3$.

The formation of perovskite, i.e., $LaAlO_3$, is often treated as a minor intransient species formed at very high temperatures, typically above 1100° C., and it is generally believed that the reaction of a small amount of lanthanum with alumina at high temperatures leads to the formation of lanthanum hexa-aluminate, or beta-alumina, U.S. 2004/0138060A1, published Jul. 15, 2004.

Destabilization of the support is not the sole cause of catalyst deactivation at high temperature. Stabilizing the catalytically active species on a thermally stable support is also needed. When an active species is supported on an oxide support, solid state reactions between the active species and the oxide support can take place at high temperature, creating some instability. That is why Machida et al. (Journal of Catalysis, 1989, vol. 120, pp. 377-386) proposed the introduction of cations of active species through direct substitution in the lattice site of hexaaluminates in order to suppress the deterioration originating from the solid state reaction between the active species and the oxide support. These cation-substituted hexaaluminates showed excellent surface area retention and high catalytic activity (see the hexaaluminate examples with Sr, La, Mn combinations in Machida et al., Journal of Catalysis, 1990, vol. 123, pp. 477-485). Therefore the preparation procedure for high temperature catalysts is critical for thermal stability and acceptable surface area.

It has long been a desire in the catalyst support arts to have a form of alumina that has high surface area like gamma-alumina and stability at high temperature like alpha-alumina. Such a catalyst support would have many uses.

Perovskite catalysts are known to have good stability in a wide variety of chemical environments. Perovskite compositions are nominally designated as $ABO_3$. For perovskites containing rare earth and transition metals, A represents a rare earth metal, such as lanthanum, neodymium, cerium or the like, and B represents a transition metal such as cobalt, iron, nickel or the like. It is known in the art that perovskite-type materials are useful for the catalytic oxidation and reduction reactions associated with the control of automotive exhaust emissions. Several techniques have been used to produce perovskite-type catalyst materials for the treatment of exhaust gases from internal combustion engines. The following patents describe such materials and techniques in the three-way catalytic application: U.S. Pat. Nos. 3,865,752; 3,865,923; 3,884,837; 3,897,367; 3,929,670; 4,001,371; 4,049,583, 4,107,163; 4,126,580; 5,318,937. In particular, Remeika in U.S. Pat. No. 3,865,752 describes the use of perovskite phases incorporating Cr or Mn on the B-site of the structure showing high catalytic activity. Lauder teaches in U.S. Pat. No. 4,049,583 (and U.S. Pat. No. 3,897,367) the formation of single-phase perovskite materials showing good activity for CO oxidation and NO reduction. Tabata in U.S. Pat. No. 4,748,143 teaches the production of single-phase perovskite oxidation catalysts where the surface atomic ratio of the mixed rare earth elements and the transition metal is in the range of 1.0:1.0 to 1.1:1.0. The rare-earth component can be introduced using a mixed rare-earth source called "Lex 70" which has a very low Ce content. Tabata further teaches in U.S. Pat. No. 5,185,311 the support of Pd/Fe by perovskites, together with bulk ceria and alumina, as an oxidation catalyst. The perovskite is comprised of rare earths on the A-site and transition metals on the B-site in the ratio 1:1.

In addition to these patents there are numerous studies reported in the scientific literature relating to the fabrication and application of perovskite-type oxide materials in the treatment of internal combustion exhaust emissions. These references include Marcilly et al., J. Am. Ceram. Soc., 53 (1970) 56; Tseung et al., J. Mater. Sci., 5 (1970) 604; Libby, Science, 171 (1971) 449; Voorhoeve et al., Science, 177 (1972) 353; Voorhoeve et al., Science, 180 (1973); Johnson et al., Thermochimica Acta, 7 (1973) 303; Voorhoeve et al., Mat. Res. Bull., 9 (1974) 655; Johnson et al., Ceramic Bulletin, 55 (1976) 520; Voorhoeve et al., Science, 195 (1977) 827; Baythoun et al., J. Mat. Sci., 17 (1982) 2757; Chakraborty et al., J. Mat. Res., 9 (1994) 986. Much of this literature and the patent literature frequently mention that the A-site of the perovskite compound can be occupied by any one of a number of lanthanide elements (e.g., Sakaguchi et al., Electrochimica Acta, 35 (1990) 65). In all these cases, the preparation of the final compound utilizes a single lanthanide, e.g., $La_2O_3$. Meadowcroft, in Nature, 226 (1970) 847, refers to the possibility of using a mixed lanthanide source for the preparation of a low-cost perovskite material for use in an oxygen evolution/reduction electrode. U.S. Pat. No. 4,748,143 refers to the use of an ore containing a plurality of rare-earth elements in the form of oxides for making oxidation catalysts.

While perovskites are quite stable under harsh environments such as high temperatures, perovskites are not porous and, thus, have low surface area. Accordingly, for use as catalytic supports, in particular, such materials have not found wide applications.

SUMMARY OF THE INVENTION

In accordance with the present invention, a perovskite of the formula $LnAlO_3$, where Ln is a lanathanide element, is formed in-situ in a dual phase with alumina to yield a perovskite-containing material that is porous, has a high surface area, and is capable of use both as a catalyst and as a catalyst support.

Important to this invention is that the perovskite, described below as alumina-based perovskite or ABP, can be formed in-situ by the addition of lanthanide to a variety of transitional aluminas and subsequent heating at relatively low temperatures to yield a porous, high surface area dual phase composition in which the perovskite is dispersed within alumina and is present in amounts of at least 9 wt. % of the composition. The in-situ formation of the perovskite composition is obtained without the need for careful measurement of the lanthanide and aluminum materials in a 1:1 molar ratio. A minimally disclosed amount of lanthanide and excess aluminum components, i.e., transitional aluminas, can be mixed in the solid state, liquid state, or mixed states and the mixture thermally treated at the proper temperature range to yield the alumina-based perovskite-composition.

DETAILED DESCRIPTION OF THE INVENTION

The catalytic metal oxides to which the present invention relates have the general empirical formula $ABO_3$ containing substantially equal numbers of metal cations occupying the A sites and the B sites in the perovskite crystalline structure. In the ideal perovskite structure such oxides contain cations of appropriate relative sizes and coordination properties and have cubic crystalline forms in which the corners of the unit cubes are occupied by the larger A site cations, each coordinated with 12 oxygen atoms, the centers of the cubes are occupied by the smaller B site cations, each coordinated with six oxygen atoms, and the faces of the cubes are occupied by oxygen atoms. Variations and distortions of this fundamental cubic crystal structure are known among materials commonly considered to be perovskites or perovskite-like. Distortions of the cubic crystal structure of perovskite and perovskite-like metal oxides include rhombohedral, orthorhombic, psuedocubic, tetragonal, and pseudotetragonal modifications.

Perovskite is characterized by a closely-packed $ABO_3$ structure that appears cubic with the larger metal ions, A, sitting at the corners of the cubic cell and the smaller metal ions, B, located at the center. When electric fields are applied to perovskites, the smaller, center ion B can move within the crystal lattice without breaking bonds. This property is important because, for example, it is reported that when some of the B sites are occupied by a catalytically active center such as a precious metal element, a change of redox environment allows the precious metal ions to shuttle back and forth for the catalysis reaction without sintering or stressing the lattice structure. This presumably enhances the stability of the material and reduces the sintering of the catalytically active precious metal, thus increasing the catalyst effectiveness and decreasing production cost.

One key shortcoming that has prevented perovskites from being important in the catalyst field is the low porosity thereof. Typically, the perovskite-like materials surface areas of at most about 10 $m^2/g$. Dispersions of perovskites on a porous support is ineffective to increase surface area due to the large crystal size of perovskite.

The A site metal used in the preparation of the alumina-based perovskite compositions of this invention is a lanthanide element having atomic number 57-71 of the periodic table of elements. Mixtures of lanthanide elements can be used. Lanthanum is preferred. The method of this invention forms a dual phase system of the in-situ formed perovskite dispersed within a separate alumina phase.

The B site materials are primarily aluminum. When forming catalytic materials, a portion or all of the aluminum sites can be substituted with precious metal components such as platinum, palladium, rhodium, gold, silver, and other Group VIII metals. Moreover, in addition to the precious metals, the aluminum sites in the perovskite can also be replaced with other metals, including metals with atomic numbers in the periodic table of 21-30, 39-48, and 57-80.

The $LnAlO_3$ perovskite is formed in accordance with this invention by mixing a lanthanide-containing compound with an excess of aluminum-containing compound and, optionally, a minor amount of precious metal, mixing and heating at the temperature described below to form the $LnAlO_3$ perovskite dispersed within an excess alumina phase. In general, the lanthanide content of the alumina-based perovskites of the present invention is at least 6% by weight. Preferably, the minimum Ln content should be at least about 12 wt. %. The maximum amount of the lanthanide needed to form a stoichiometric perovskite is not limited. However, to form alumina-based perovskites in accordance with the present invention with a useful porosity for catalytic materials, it has been found that the upper limit of the lanthanide should be about 35%, and preferably should be no higher than about 24% by weight. In general, the perovskite phase will comprise at least about 9 wt. % of the ABP composition. As the level of perovskite increases beyond 50 wt. % of the composition, the porosity of the composition is greatly reduced. By limiting the lanthanide level to no more than 35 wt. %, the perovskite content of the ABP composition of the present invention is provided at up to about 50 wt. %. The alumina-based perovskite compositions of the present invention, therefore, have high porosity and high surface area, typically having a BET surface area of at least 20 $m^2/g$, and more typically higher than 40 $m^2/g$. ABP compositions with BET areas of at least 50 $m^2/g$, and even above 100 $m^2/g$, can be readily prepared.

Surprisingly, the alumina-based perovskite compositions of the present invention can be made with many different alumina precursors, including boehmite, pseudo-boehmite, gamma-alumina, flash-calcined gibbsite, rehydrated rho-alumina, and gibbsite.

Minor amounts of precious metal can be incorporated into the ABP precursor mix prior to calcination. X-ray diffraction of the alumina-based perovskite shows that the intensity of the free precious metal peak relative to the residual alumina peak is substantial. Accordingly, it is not clear as to whether the precious metal is incorporated into the perovskite structure or dispersed within the alumina matrix. A precious metal component can also be incorporated into the alumina-based perovskite composition of this invention by impregnating the formed ABP material. Again, it is uncertain at this time whether by such method the precious metal is incorporated into the perovskite lattice structure. It has been shown, however, that the ABP composition of this invention reduces the sintering of the incorporated precious metal. SEM images have shown significantly smaller particle sizes of the precious metal when incorporated into the ABP either during or after ABP formation. The higher dispersion of the precious metal provides for increased catalytic activity. Precious metals such as platinum, palladium, rhodium, ruthenium, gold, silver, etc., can be added to the ABP composition.

In accordance with the method of the present invention for forming the aluminum-based perovskite compositions, the lanthanide compounds and aluminas can be mixed in the liquid state, solid state, or a mixture of liquid and solid. Typically, the alumina is present as a solid powder, while the lanthanide can be in the form of solid lanthanide oxides or water-soluble lanthanide salts, such as the nitrate salt, for example. If precious metals or other metal species are added, again, the materials can be added as solid oxides, but more preferably as water-soluble simple or complex salts. In accordance with the method of this invention, the lanthanide and alumina components are not measured to provide the 1:1 ratio of Ln:Al that has typically been used to form perovskite materials. It is necessary, however, that the lanthanide content be at least about 6 wt. % of the ABP composition, typically from about 6-35 wt. %, and more preferably from about 12-24 wt. % of the ABP composition. If precious metal is added, it is typically added in amounts of 0.5-5 wt. %, more typically from about 2-3 wt. % of the ABP composition. If metals other than precious metals are added, such metals should not exceed 20 wt. % of the aluminum content. Once the components are mixed, it is necessary to heat the composition to form the perovskite phase in-situ. The temperature range has been found to be rather important in achieving the ABP materials of this invention. In general, the precursor ABP composition mixture of the present invention is heated at a temperature of from about 900° C. to under 1100° C. for about 0.5 to 8 hours. Typically, the temperature treatment will range from about 1-4 hours. Upon heat treatment, the ABP material is formed which comprises the $LnAlO_3$ perovskite formed in-situ and dispersed within an alumina matrix.

The perovskite compositions of the invention can be used as catalysts in the form of free-flowing powders, for example, in fluid-bed reaction systems, or in the form of shaped structures providing efficient contact between the catalyst and reactant gases. The catalyst compositions can contain minor or major amounts of catalytically inert materials, with the catalytic compositions primarily on the surfaces of the inert material or dispersed throughout. For example, the powdered compounds can be formed into porous catalyst pellets in which they are dispersed throughout by conventional techniques employing pellet presses, rolling mixer or extruders. Dispersants, lubricants, and binders are often used in conjunction with the preparation of such pellets.

The catalytic compositions of this invention are preferably used in the form of coatings on suitable refractory supports. Such supports can be composed solely or primarily of ceramic compositions, such as cordierite monolith honeycomb, having softening or melting temperatures above the temperatures involved in forming or coating these catalytic compositions on such supports, as well as of alundum, gamma alumina, silicon carbide, titania, zirconia, and other such refractory materials, or of metallic surface.

The compositions can be applied to the supports in any convenient manner. Preferably, the ABP compositions are preformed and applied to the support structure in a slurry which can optionally contain diluent materials which can also be catalytic materials.

The catalytic compositions of the present invention are stable and durable at high temperatures and can be used for a wide variety of liquid and gas-phase reactions. They are particularly effective in the catalyzation of the oxidation of hydrocarbons and carbon monoxide and also the reaction between nitrogen oxide (NOx) and carbon monoxide to give nitrogen and carbon dioxide. They exhibit increased resistance to poisoning by the lead and sulfur compounds present in the exhaust of internal combustion engines operated on leaded gasoline.

The catalysts of this invention are useful as catalysts for the oxidation of oxidizable carbon components to compounds of higher oxidation states, the reduction of nitrogen oxides to compounds of lower oxidation states and the reduction of hydrocarbyl mercaptans and sulfides to substantially sulfur-free hydrocarbon compositions.

Among the oxidation processes for which the present catalysts can be used is the oxidation of carbon monoxide to carbon dioxide and of hydrocarbons to carbon dioxide. Hydrocarbons which can be used include those having 1-20 carbon atoms, including those that are normally gaseous and those that can be entrained in a gaseous stream such as the liquefied petroleum gases and the volatile aromatic, olefinic and paraffinic hydrocarbons which are commonly in industrial solvents and in fuels for internal combustion engines. The oxidant for these processes can be oxygen, nitrogen oxides, such as NO and $NO_2$, which components are normally present in the exhaust gases of internal combustion engines.

The ABP compositions of this invention can also be used to catalyze the reduction of such oxides of nitrogen as nitric oxide, nitrogen dioxide, dinitrogen trioxide, dinitrogen tetroxide and the higher oxides of nitrogen such as may be present in waste gases from the production and use of nitric acid as well as in the exhaust gases of internal combustion engines. The reductant for these processes can be hydrogen, carbon monoxide and such hydrocarbons as described above and as present in said exhaust gases.

Thus, the compositions of this invention are useful for the oxidation of carbon monoxide and volatile hydrocarbons and for the simultaneous reduction of oxides of nitrogen under conditions typical of those involved in the cleanup of the exhaust gases of automotive and other internal combustion engines are capable of effecting the substantially complete conversion of the obnoxious components of such gases to innocuous substances.

EXAMPLE 1

ABP with 24 wt % of La by incipient wetness on γ-alumina 416.5 g of $La(NO_3)_3.6H_2O$ (Alfa Aesar, 99.9%) was dissolved in 500.0 g DI-water. This made Solution A. Solution A was added drop-wise to 421.0 g of γ-alumina powder (Sasol, 99.9%) while stirring the powder to make a uniform paste (the procedure is known as incipient wetness). The paste was dried at 110° C. in air overnight and the dried powder was ground briefly. The powder was heated to 1000° C. at a heating rate of about 10° C./min and the temperature maintained at 1000° C. for 2 hours. The calcined sample was removed from the oven and cooled to ambient temperature.

The sample was submitted for XRD and BET surface area analyses.

Figure 1:
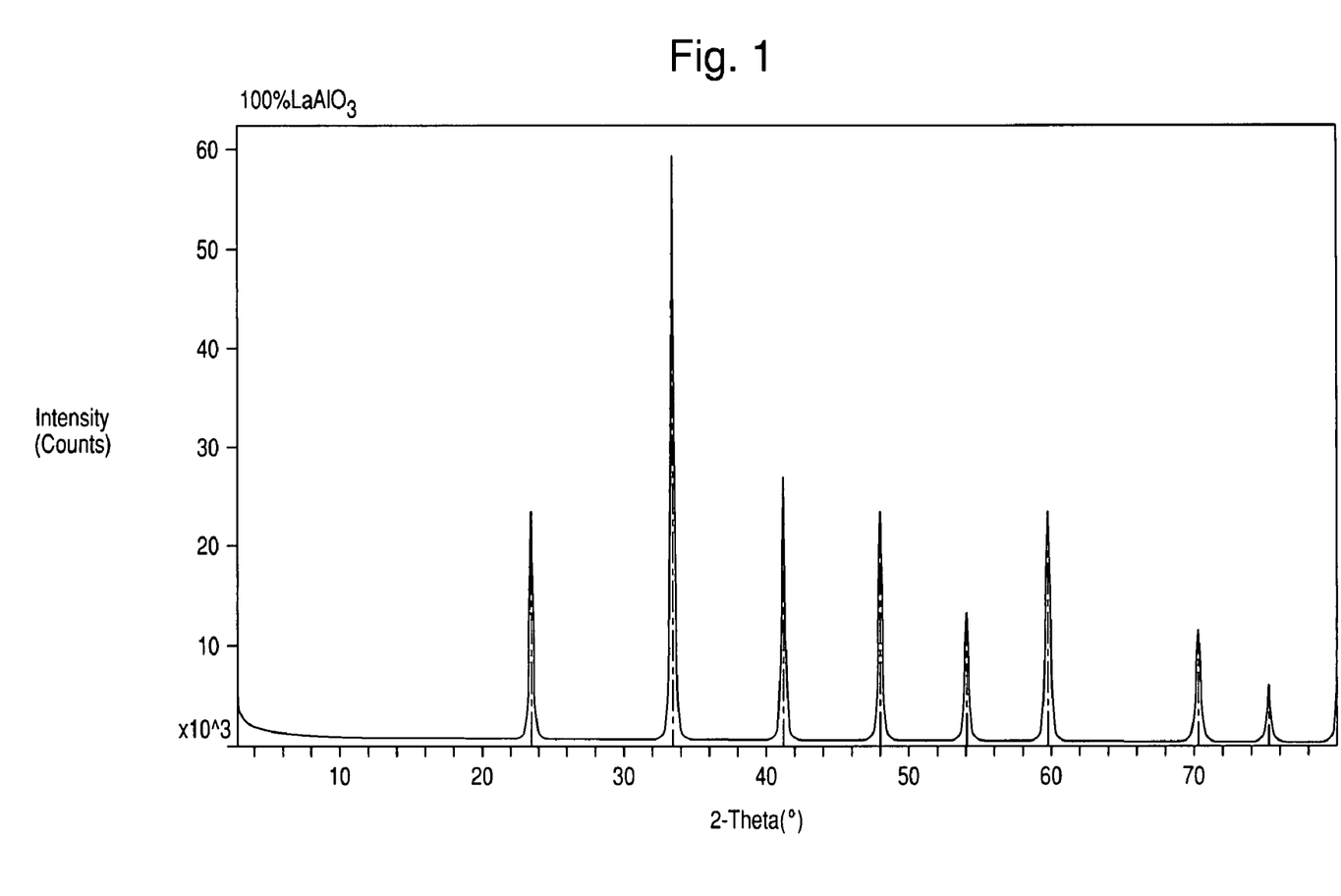
FIG. 1 is an XRD pattern of a pure stoichiometric $LaAlO_3$ perovskite provided from a commercial source.
Figure 2:
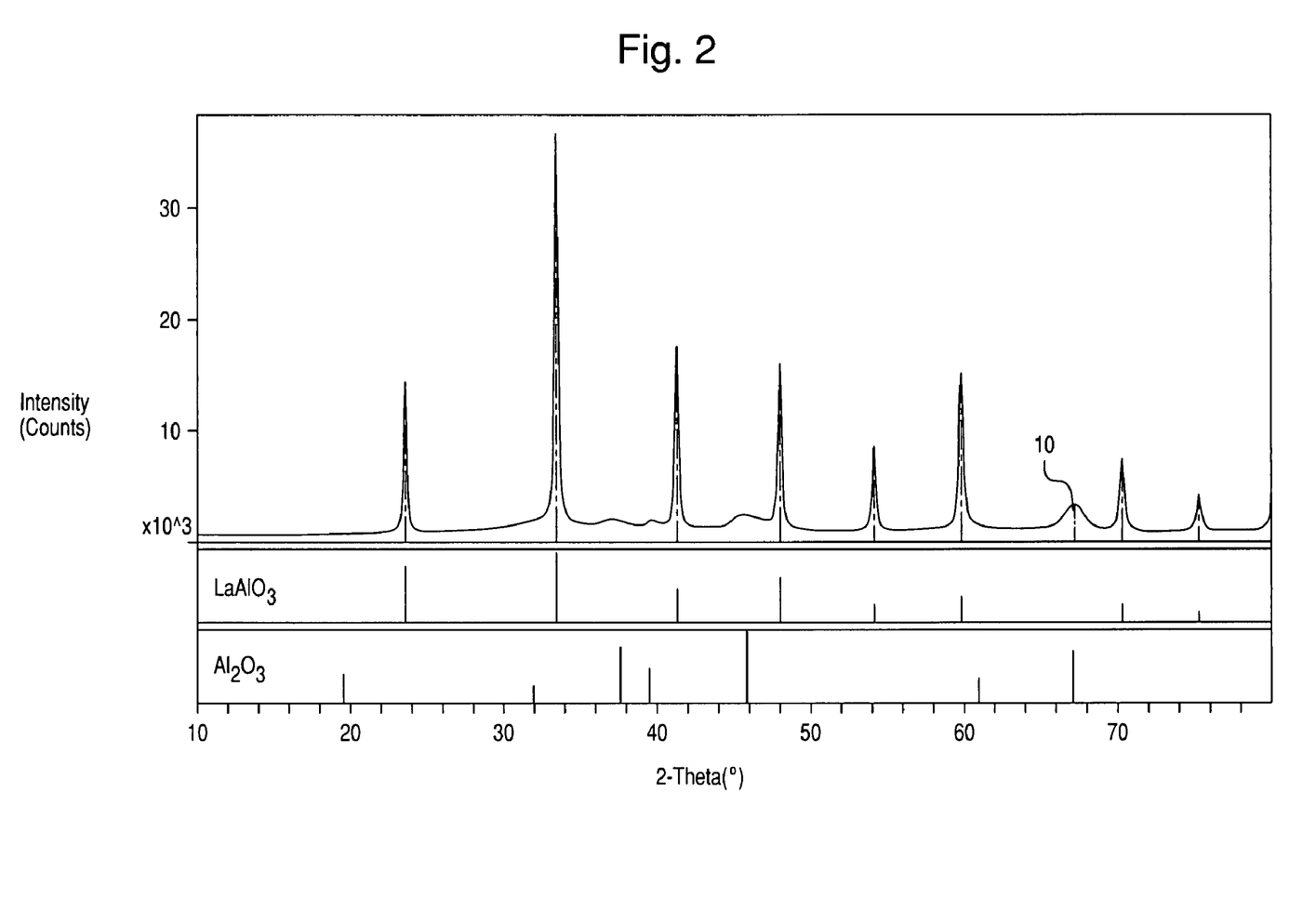
FIG. 2 is an XRD pattern of the alumina-based perovskite of Example 1.

The XRD powder patterns indicated the sample contained a perovskite structure. FIG. 2 illustrates the XRD pattern of the sample produced by Example 1. FIG. 1 is the XRD of a commercial $LaAlO_3$ perovskite. It can be seen that the ABP formed in Example 1 has an XRD pattern almost identical to that of the pure perovskite as shown in FIG. 2. Peak 10 in Example 2 represents the alumina phase of the ABP. $N_2$ porosity measurement gave a BET surface area of 66 $m^2/g$, a pore volume 0.43 cc/g, and an average pore width of 26.3 nm.

$N_2$ adsorption data was obtained on a Micromeritics ASAP2400 system. The samples were heated at 250° C. under vacuum for at least 6 hours before the analysis. The surface area was calculated by the Brunauer-Emmett-Teller (BET) method with 39 relative pressure points. The pore volume represents the total pore volume of pores with a pore radius less then 1000 Å.

X-ray diffraction was performed on a Philips APD 3720 diffractometer with CuKα radiation at 1.5406 Å, voltage 45 kV, and current 40 mA. An automatic compensator divergency mode was used with a receiving slit of 0.2 mm, graphite monocromater, scan range (2θ) 1-40° with step size of 0.04°, and counting time of 2 second/step.

EXAMPLE 2

ABP with 24 wt % of La in γ-alumina by solid-state reaction 416.5 g of $La(NO_3)_3.6H_2O$ (Alfa Aesar, 99.9%) and 421g of γ-alumina (Sasol, 99.9%) was mixed and the mixture ground thoroughly. The mixture was dried overnight and the powder ground briefly. The ground mixture was heated to 1000° C. at a heating rate of about 10° C./min and the temperature maintained at 1000° C. for 2 hours. The calcined sample was removed from the oven to cool to ambient temperature.

The sample was submitted for XRD and BET surface area analyses. The XRD powder patterns indicated the sample contained a perovskite structure. $N_2$ porosity measurement gave a BET surface area of 58 $m^2/g$, a pore volume 0.25 cc/g, and an average pore width 17.2 nm.

EXAMPLE 3

ABP with 3 wt % of Pd and 24 wt % of La in γ-alumina 11.0 g of $La(NO_3)_3.6H_2O$ (Alfa Aesar, 99.9%) and 10.5 g of γ-alumina (Sasol, 99.9%) were mixed and the mixture ground thoroughly. 2.2 g of $Pd(NO3)_2$ solution (20.5 wt % Pd, Engelhard) were added to above mixture dropwise while stirring the mixture. The paste was dried at 110° C. in air overnight and the dried powder ground briefly. The mixture was separated into two samples and the samples heated to 954° and 1093° C., respectively, at a heating rate of about 10° C./min. The temperatures were maintained at 954° and 1093° C. for two hours, respectively. The calcined samples were removed from the oven and cooled to ambient temperature.

The samples were submitted for XRD and BET surface area analyses.

The XRD powder patterns indicated that both samples contained a perovskite structure. $N_2$ porosity measurement gave the following data for the two samples, as shown in Table 1.

TABLE 1

| Sample ID | Calcination T (° C.) | BET (m2/g) | PV (cc/g) | PS (nm) |
|---|---|---|---|---|
| 3 | 954 | 59 | 0.25 | 17.2 |
| 4 | 1093 | 49 | 0.24 | 19.0 |

EXAMPLE 4

Replacing La with alkaline-earth and rare-earth metals in γ-alumina 10.5 g of γ-alumina (Sasol, 99.9%) was mixed with W g of the following metal salts and the mixture ground thoroughly. See Table 2.

| Sample ID | Metal Salt | W (g) | Mole (metal) |
|---|---|---|---|
| 5 | $BaCO_3$ | 7.11 | 0.036 |
| 6 | $Mg(NO_3)_2·6H_2O$ | 9.23 | 0.036 |
| 7 | $Ce(NO_3)_3·6H_2O$ | 10.39 | 0.024 |
| 8 | $Gd(NO_3)_3·6H_2O$ | 10.39 | 0.024 |
| 9 | $La(NO_3)_3·6H_2O$ | 10.39 | 0.024 (control) |

Each mixture was dried at 110° C. overnight and the powder mixture ground briefly. The mixtures were heated to 1000° C. at a heating rate of about 10° C./min; and the temperature maintained at 1000° C. for two hours. The calcined samples were removed from the oven, and cooled to ambient temperature.

The samples were submitted for XRD analysis. The La-containing sample resulted in a distinct perovskite structure being formed. The Ce- and Gd-containing samples indicated small levels of perovskite.

EXAMPLE 5

ABP (24% La) from Pseudo Boehmite 26.0 g of pseudo boehmite (Catapal C1 from Sasol) was added to 100 g of DI-$H_2O$, and the pH adjusted to 3.3 by addition of 1:10 $HNO_3$. This made Solution A.

19.6 g of $La(NO_3)_3$ was dissolved in 25 g of DI-$H_2O$. This made Solution B.

Solution B was added to Solution A drop-wise while vigorously stirring Solution A. This formed Gel C.

Gel C at was dried at 110° C. overnight and the dried solid ground into powder.

The powder was heated to 1093° C. at a heating rate of about 10° C./min, and the temperature maintained at 1093° C. for 2 hours. The calcined sample was removed from the oven, and cooled to ambient temperature.

The XRD powder pattern taken of the sample indicated the sample contained well defined perovskite structure.

EXAMPLE 6

ABP (24% La+3% Pd) from Pseudo Boehmite 24.4 g of pseudo boehmite (Catapal C1 from Sasol) was added to 90 g of DI-$H_2O$, and the pH adjusted to 3.3 by addition of 1:10 $HNO_3$. This made Solution A.

21.8 g of $La(NO_3)_3$ was dissolved in 30 g of DI-$H_2O$. This made Solution B.

4.28 g of $Pd(NO_3)_2$ solution (20.5% Pd) was added to Solution B. This made Solution C.

Solution C was added to Solution A drop-wise while vigorously stirring Solution A. This formed Gel D.

Gel D was dried at 110° C. overnight and the dried solid ground into powder.

The powder was heated to 1093° C. at a heating rate of about 10° C./min. The temperature was maintained at 1093° C. for 2 hours. The calcined sample was removed from the oven and cooled to ambient temperature.

The XRD powder pattern indicated the sample contained well defined perovskite structure.

EXAMPLE 7

ABP (24% La+3% Pt) from Pseudo Boehmite 26.0 g of pseudo boehmite (Catapal C1 from Sasol) was added to 100 g of DI-$H_2O$, and the pH adjusted to 3.3 by the addition of 1:10 $HNO_3$. This made Solution A.

21.8 g of $La(NO_3)_3$ was dissolved in 30 g of DI-$H_2O$. This made Solution B.

6.52 g of $Pt(NO_3)_2$ solution (16.98% Pt) was added to Solution B. This made Solution C.

Solution C was added to Solution A drop-wise while vigorously stirring Solution A. This formed Gel D.

Gel D was dried at 110° C. overnight and the dried solid ground into powder.

The powder was heated to 1093° C. at a heating rate of about 10° C./min. The temperature was maintained at 1093° C. for 2 hours. The calcined sample was removed from the oven and cooled to ambient temperature.

The XRD powder pattern indicated the sample contained well defined perovskite structure.

EXAMPLE 8

ABP (24% La+3% Rh) from Pseudo Boehmite 26.0 g of pseudo boehmite (Catapal C1 from Sasol) was added to 100 g of DI-$H_2O$, and the pH adjusted to 3.3 by 1:10 $HNO_3$. This made Solution A.

21.8 g of $La(NO_3)_3$ was dissolved in 20 g of DI-$H_2O$. This made Solution B.

8.72 g of $Rh(NO_3)_3$ solution (10.00% Rh) was added to Solution B. This made Solution C.

Solution C was added to Solution A drop-wise while vigorously stirring Solution A. This formed Gel D.

Gel D was dried at 110° C. overnight and the dried solid ground into a powder.

The powder was heated to 1093° C. at a heating rate of about 10° C./min. The temperature was maintained at 1093° C. for 2 hours. The calcined sample was removed from the oven and cooled to ambient temperature.

The XRD powder pattern indicated the sample contained well defined perovskite structure.

EXAMPLE 9

ABP (24% La) from Boehmite 24.4 g of boehmite (P200 from Sasol) was added to 100 g of DI-$H_2O$, and the pH adjusted to 3.3 by 1:10 $HNO_3$. This made Solution A.

19.6 g of La($NO_3$)$_3$ was dissolved in 25 g of DI-$H_2O$. This made Solution B.

Solution B was added to Solution A drop-wise while vigorously stirring Solution A. This formed Gel C.

Gel C was dried at 110° C. overnight and the dried solid ground into powder.

The powder was heated to 1093° C. at a heating rate of about 10° C./min. The temperature was maintained at 1093° C. for 2 hours. The calcined sample was removed from the oven and cooled to ambient temperature.

The XRD powder pattern indicated the sample contained well defined perovskite structure.

EXAMPLE 10

ABP (24% La+3% Pd) from Boehmite 24.4 g of boehmite (P200 from Sasol) was added to 80 g of DI-$H_2O$, and the pH adjusted to 3.3 by 1:10 $HNO_3$. This made Solution A.

21.8 g of La($NO_3$)$_3$ was dissolved in 30 g of DI-$H_2O$. This made Solution B.

4.28 g of Pd($NO_3$)$_2$ solution (20.5% Pd) was added to Solution B. This made Solution C.

Solution C was added to Solution A drop-wise while vigorously stirring Solution A. This formed Gel D.

Gel D was dried at 110° C. overnight and the dried solid ground into powder.

The powder was heated to 1093° C. at a heating rate of about 10° C./min. The temperature was maintained at 1093° C. for 2 hours. The calcined sample was removed from the oven and cooled to ambient temperature.

The XRD powder pattern indicated the sample contained well defined perovskite structure.

EXAMPLE 11

ABP (24% La) from Rehydrated Rho Alumina 8.7 g of La($NO_3$)$_3$ was dissolved in 19 g of DI-$H_2O$. This made Solution A.

Solution A was added drop-wise to 26 g of rehydrated rho alumina (RA5L from Engelhard) while stirring the powder vigorously until a uniform paste was formed.

The paste was dried at 110° C. overnight and the dried solid ground into powder.

The powder was heated to 1093° C. at a heating rate of about 10° C./min. The temperature was maintained at 1093° C. for 2 hours. The calcined sample was removed from the oven and cooled to ambient temperature.

The XRD powder pattern indicated the sample contained well defined perovskite structure.

EXAMPLE 12

ABP (24% La+3% Pd) from Rehydrated Rho Alumina 12.4 g of rehydrated rho alumina (RA5L from Engelhard) and 11.0 g of La($NO_3$)$_3$ were mixed thoroughly by grinding.

2.2 g of Pd($NO_3$)$_2$ aqueous solution (20.5 wt % Pd) was added to the ground mixture while stirring the powder thoroughly.

The Pd-containing powder was dried at 110° C. overnight and the dried solid ground into powder.

The powder was heated to 1093° C. at a heating rate of about 10° C./min. The temperature was maintained at 1093° C. for 2 hours. The calcined sample was removed from the oven and cooled to ambient temperature.

The XRD powder pattern indicated the sample contained well defined perovskite structure.

EXAMPLE 13

ABP (24% La) from Gibbsite

A mixture of 30.3 g of gibbsite (C30 from Almatis) and 20.8 g of La($NO_3$)$_3$ was thoroughly ground.

The ground mixture was heated at 110° C. for 20 minutes while stirred.

The stirred mixture was dried at 110° C. overnight and the dried solid ground into powder.

The dried powder was heated to 1093° C. at a heating rate of about 10° C./min. The temperature was maintained at 1093° C. for 2 hours. The calcined sample was removed from the oven and cooled to ambient temperature.

The XRD powder pattern indicated the sample contained well defined perovskite structure.

EXAMPLE 14

ABP (24% La+3% Pd) from Gibbsite

A mixture of 15.0 g of gibbsite (C30 from Almatis) and 11.0 g of La($NO_3$)$_3$ was thoroughly ground.

2.2 g of Pd($NO_3$)$_2$ aqueous solution (20.5 wt % Pd) was added to the mixture drop-wise while stirring thoroughly.

The mixture was heated at 110° C. for 2 minutes and stirred thoroughly.

The stirred mixture was dried at 110° C. overnight.

The dried powder was heated to 1093° C. at a heating rate of about 10° C./min. The temperature was maintained at 1093° C. for 2 hours. The calcined sample was removed from the oven and cooled to ambient temperature.

The XRD powder pattern indicated the sample contained well defined perovskite structure.

EXAMPLE 15

An ABP composition formed by the method of Example 1 was tested for stability against acid leaching. 10 g of the ABP was slurried in a solution of 95 g water and 5 g acetic acid. The slurry at pH of 3.4 was stirred for 1 hour, filtered, and the solid washed. The XRD of the solid was identical to the XRD of the starting ABP composition. An elemental analysis of the liquid filtrate showed no appreciable La by acid leaching. This is important since many catalyst slurries are acidic, and leaching of La from catalyst particles into solution by acid, such as acetic acid, is a commonly known problem.

What is claimed is:

1. An alumina-based perovskite composition comprising a dual-phase system of alumina and in-situ formed LnAlO$_3$ perovskite dispersed in said alumina, said perovskite comprising at least 9 wt. % of said composition, wherein Ln is a lanthanide element.

2. The composition of claim 1 wherein the lanthanide content of said composition is about 6-35 wt. %.

3. The composition of claim 1 wherein Ln is lanthanum.

4. The composition of claim 3 wherein the lanthanum content of said composition is about 12-24 wt. %.

5. The composition of claim 1 having a BET surface area of greater than 20 $m^2/g$.

6. The composition of claim 1 further containing a precious metal comprising 0.5-5 wt. % of the composition.

7. The composition of claim 6 wherein the precious metal is selected from platinum, palladium, and rhodium.

8. The composition of claim 1 wherein all or part of the aluminum sites in the perovskite are replaced with a metal other than Al.

9. A method of catalyzing a chemical reaction comprising contacting at least one chemical reactant with the composition of claim 1 having optionally incorporated therein a catalytic metal.

10. A method of forming an alumina-based perovskite composition comprising: mixing a source of lanthanide and alumina to form a mixture, the amount of lanthanide comprising from about 6-35 wt. % of the composition, and heating said mixture at a temperature of about 900° C. to under 1100° C. for 0.5-8 hours to form a composition comprising in-situ formed $LnAlO_3$ perovskite dispersed in alumina, wherein Ln is a lanthanide element.

11. The method of claim 10 wherein Ln is lanthanum.

12. The method of claim 11 wherein said lanthanum comprises 12-24 wt. % of said formed composition.

13. The method of claim 10 wherein said source of alumina is a transitional alumina.

14. The method of claim 13 wherein said transitional alumina comprises boehmite, pseudoboehmite, gamma-alumina, aluminum trihydroxide, and rho-alumina.

15. The method of claim 10 comprising mixing a solid alumina with either a liquid or solid source of lanthanide.

16. The method of claim 15 wherein said lanthanide source is a lanthanide salt dissolved in water.

17. The method of claim 15 wherein said lanthanide source is a solid lanthanide oxide or salt.

18. The method of claim 10 wherein a precious metal is mixed with said lanthanide source and said alumina, and said precious metal comprises from 0.5-5 wt. % of the formed composition.

19. The method of claim 10 wherein all or part of the aluminum sites in said perovskite are replaced with a metal other than Al.

20. The method of claim 10 wherein a precious metal is impregnated into the formed alumina-based perovskite composition.

* * * * *